United States Patent [19]

Siver

[11] Patent Number: 5,531,244
[45] Date of Patent: Jul. 2, 1996

[54] HEMISPHERICAL BALL VALVE

[75] Inventor: Chester A. Siver, Belleair, Fla.

[73] Assignee: Conval, Inc., Somers, Conn.

[21] Appl. No.: 506,571

[22] Filed: Jul. 25, 1995

[51] Int. Cl.$^6$ .............................. F16K 5/06; F16K 41/04; F16K 43/00

[52] U.S. Cl. ........................ 137/315; 251/172; 251/192; 251/214; 251/315.12; 251/315.16; 251/316

[58] Field of Search ............................. 137/315; 251/160, 251/192, 214, 309, 312, 315.01, 315.10, 315.11, 315.12, 315.13, 315.14, 315.16, 316, 317, 172

[56] References Cited

U.S. PATENT DOCUMENTS

| | | | |
|---|---|---|---|
| 3,231,235 | 1/1966 | Anderson et al. | 251/214 |
| 3,239,191 | 3/1966 | Widera | 251/214 |
| 3,384,341 | 5/1968 | Ripert | 251/317 |
| 3,394,916 | 7/1968 | Birr | 251/172 |
| 3,445,087 | 5/1969 | Priese et al. | 251/317 |
| 3,488,033 | 1/1970 | Priese | 251/172 |
| 3,497,176 | 2/1970 | Priese | 251/172 |
| 3,582,041 | 6/1971 | Priese | 251/214 |
| 3,586,289 | 6/1971 | Priese | 251/214 |
| 3,697,043 | 10/1972 | Baker | 251/317 |
| 3,717,323 | 2/1973 | Geipel | 251/315.13 |
| 3,885,771 | 5/1975 | Baumann | 251/298 |
| 3,893,469 | 7/1975 | Baker | 137/584 |
| 3,949,965 | 4/1976 | Sharples et al. | 251/315.01 |
| 4,027,698 | 6/1977 | Weinhold | 251/315.16 |
| 4,103,868 | 8/1978 | Thompson | 251/283 |
| 4,150,811 | 4/1979 | Condit | 251/315 |
| 4,157,170 | 6/1979 | McClurg | 251/315 |
| 4,257,576 | 3/1981 | Legris | 251/315 |
| 4,388,945 | 6/1983 | Johnson et al. | 251/315 |
| 4,399,977 | 8/1983 | Wheatley | 251/315 |
| 4,558,874 | 12/1985 | Williams et al. | 251/214 |
| 4,587,990 | 5/1986 | Pennell et al. | 137/454.2 |
| 4,802,652 | 2/1989 | Kaniut et al. | 251/181 |
| 4,846,213 | 7/1989 | Hutchens et al. | 137/241 |
| 4,940,208 | 7/1990 | Kemp | 251/315 |
| 4,962,911 | 10/1990 | Soderberg | 251/159 |
| 5,145,150 | 9/1992 | Brooks | 251/188 |
| 5,181,690 | 1/1993 | Gonsior | 251/172 |
| 5,224,829 | 7/1993 | Horvei | 137/315 |

FOREIGN PATENT DOCUMENTS

5569363  5/1980  Japan ............................. 251/315.12

Primary Examiner—George L. Walton
Attorney, Agent, or Firm—Pepe & Hazard

[57] ABSTRACT

A ball valve for controlling fluid flow comprises a housing with a chamber therein and a fluid flow passage therethrough having an inlet and outlet portion to and from the chamber adjacent the lower end of the housing. An opening in the upper end of the housing communicates with the chamber and is sealed by a bonnet which is removably fastened to the housing and has a passage therethrough. A ball member is rotatably seated in the chamber and has a spheroidal lower portion with an anticlinal shaped fluid flow passage therethrough which intersects its axis of rotation. Valve seats are removably seated in the chamber about the inlet and outlet portions of the flow passage and have concave surfaces which seat the ball member and seal about the flow passage therethrough. The opening in the housing is cooperatively dimensioned with respect to the ball member and the valve seats to permit their removal therethrough. The upper portion of the ball member is operatively connected through the passage in the bonnet to an element for rotating the ball member about its axis of rotation between the open and closed positions.

17 Claims, 5 Drawing Sheets

HEMISPHERICAL BALL VALVE

BACKGROUND OF THE INVENTION

The present invention relates to ball valves, and, more particularly, to ball valves for use with high temperature and/or high pressure fluids.

Ball valves have wide application in the control of fluids in various industrial applications. Such valves generally have a spherical ball with a passage extending therethrough which allows fluid flow through the valve when the valve is open. When the valve is closed by rotating the ball, valve seats about the flow passage in the housing seal against the surface of the ball member to preclude fluid flow through the valve.

Under less demanding operating conditions, various metal alloys may be selected for the components so that the valve will exhibit long life without need for frequent replacement of parts. However, valves used in applications involving high pressure particularly in combination with high temperature and/or highly corrosive fluids, such as encountered in the utility and chemical process industries, exhibit a relatively short useful life because of erosion of the valve components, particularly in the area about the valve seats and in the flow passages. Eventually, this erosion will require removal of the entire valve from the line and replacement.

To facilitate inline service without necessitating removal of the entire valve assembly from its operational environment, some valve bodies have been designed with an opening which permits the ball member and valve seats to be removed. Commonly referred to as a top entry ball valve, this type of ball valve is illustrated in Canuet et al U.S. Pat. No. 4,802,652.

However, there remains a need for ball valves which not only are easy to repair, but also long lived in operation without frequent parts replacement.

It is an object of the present invention to provide a novel ball valve in which erosion is reduced.

It is also an object to provide such a ball valve in which the valve seats may be readily removed and replaced.

Another object is to provide such a ball valve in which the valve seats are movable between the valve body and ball member to accommodate dimensional variations and to ensure good sealing action with the ball member.

Yet another object is to provide such a ball valve employing novel valve seat inserts which are urged against the ball member.

A further object is to provide such a ball valve with a highly effective bonnet/valve stem seal.

SUMMARY OF THE INVENTION

It has now been found that the foregoing and related objects may be readily attained in a valve for controlling fluid flow having open and closed positions, and including a housing providing a chamber therewithin, a removable bonnet on the housing, and a ball member rotatably seated in the chamber. The housing has a fluid flow passage extending therethrough with inlet and outlet portions to and from the chamber adjacent its lower end, and an opening in its upper end communicating with the chamber. The removable bonnet on the housing seals the opening in the upper end of the housing, has a passage therethrough from the chamber, and is fastened to the housing.

The ball member has an axis of rotation aligned with the center of the opening in the housing, and the opening in the housing is cooperatively dimensioned with respect to the ball member to permit removal of the ball member therethrough. The ball member includes an upper portion and a spheroidal lower portion which has an anticlinal shaped fluid flow passage therethrough with inlet and outlet ends. The inlet and the outlet ends of the passage in the ball member are aligned with the inlet and outlet portions of the flow passage into and from the chamber in the open position of the valve and are displaced from the inlet and outlet portions of the flow passage in the closed position of the valve. The fluid flow passage extends through the axis of rotation of the ball member.

Valve seats are removably seated on the housing within the chamber and extend about the inlet and outlet portions of the flow passage. The valve seats include a concave surface in sealing engagement with the surface of the lower portion of the ball member, and are dimensioned and configured for insertion into the chamber through the opening in the housing.

Means is provided for rotating the ball member about its axis of rotation between the open and closed positions of the valve, and the means for rotating has a portion disposed outwardly of the housing and bonnet and operatively connected to the upper portion of the ball member through the passage in the bonnet.

Preferably, the means for rotating includes a valve stem extending within the passage of the bonnet and connected at one end to the upper portion of the ball member. Desirably, the valve stem is separately formed from, and coupled to, the ball member so that it may move axially to obtain the optimum sealing action about the stem.

Preferably, the anticlinal shaped fluid flow passage through the ball member has a pair of arcuate legs intersecting at the axis of rotation of the ball member to form a generally inverted U-shaped fluid flow passage through the ball member. The valve seats are oriented at an angle of about 45 degrees to the axis of rotation of the ball member.

Alternatively, the anticlinal shaped fluid flow passage through the ball member may be of generally inverted V-shaped configuration, and the valve seats may still be oriented at an angle of 45° to the axis of rotation of the ball member.

Desirably, the valve includes resiliently deflectable means biasing the ball member towards the valve seats. The resiliently deflectable means may comprise a helical spring or at least one resiliently deflectable annular member.

In a preferred embodiment, the passage in the bonnet is configured to provide a shoulder, and the valve includes a first annular sealing member disposed about the valve stem and against the shoulder. The valve stem has a collar within the passage in the bonnet and disposed below and bearing against the annular sealing member, and a second annular sealing member is disposed about the stem below the collar. A packing gland is disposed about the valve stem below the second annular sealing member and above the resiliently deflectable means, and the internal pressure at the bottom of the bonnet and the deflectable means bias the stem and packing gland against the second sealing member and the collar to effect a highly effectual sealing action about the stem within the bonnet.

Preferably, the valve seats have convex seating surfaces which seat on concave generally annular seating surfaces in the housing chamber about the inlet and outlet portions of the flow passage. The valve seats may include a groove extending about the circumference thereof which provides some resilient deflection of the peripheral portion of the valve seat and pressure in the passage in the body to bias the concave sealing surface against the surface of the lower portion of the ball member.

Generally, the inlet portion of the flow passage extends from an inlet port, and the outlet portion of the flow passage extends from an outlet port. In an alternative embodiment, the inlet and outlet ports lie in planes oriented at an angle with respect to each other. Preferably, the planes in which the inlet and outlet ports lie are oriented at an angle of 45° to the axis of rotation of said ball member and 90° with respect to each other.

DETAILED DESCRIPTION OF THE PREFERRED EMBODIMENT

Figure 1:
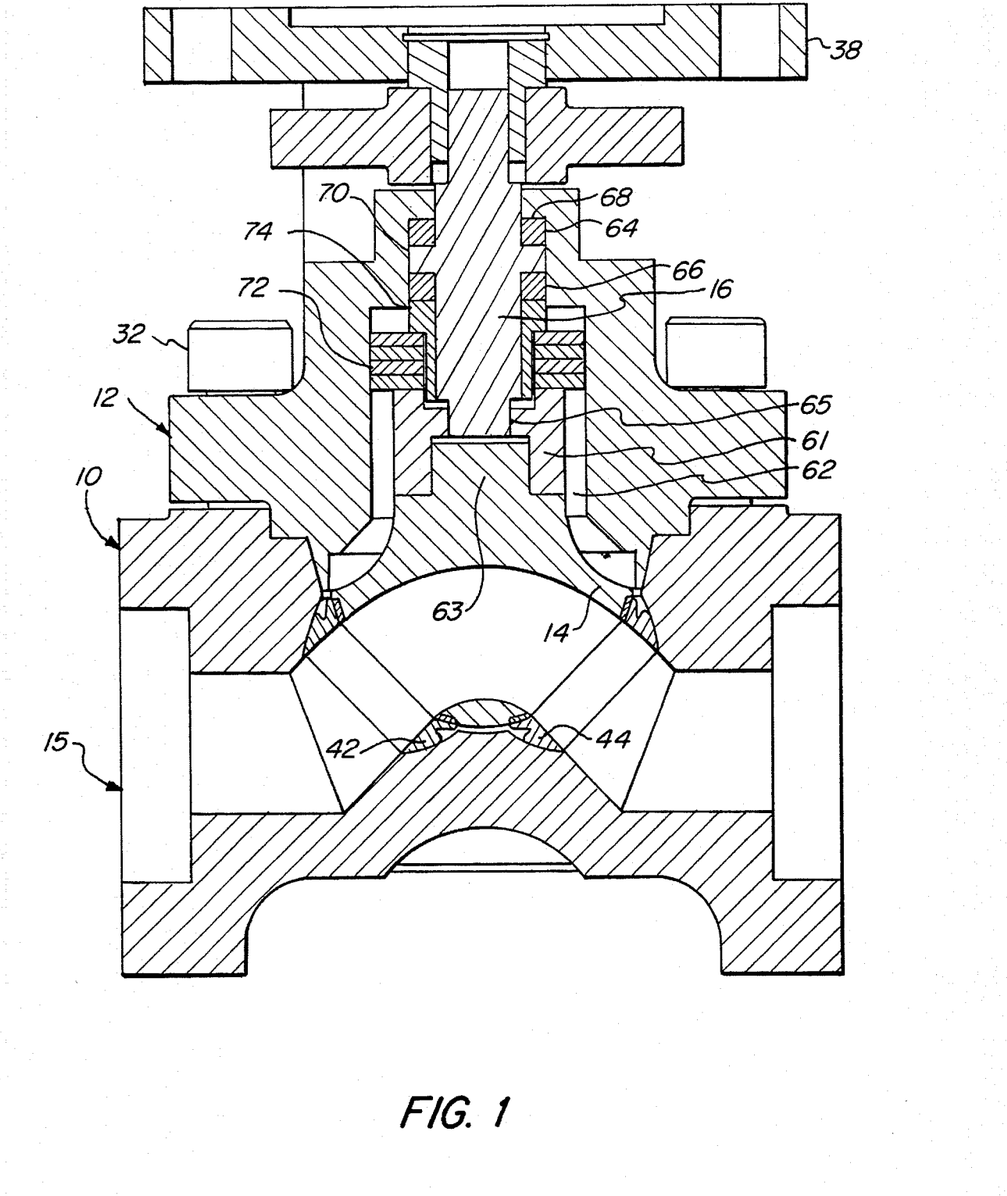
FIG. 1 is a cross sectional view of a ball valve embodying the present invention, and with the ball member in the valve open position.

Turning first to FIG. 1, therein illustrated is a ball valve embodying the present invention and comprised of a valve body generally designated by the numeral 10, a ball member generally designated by the numeral 14, a fluid flow passage generally designated by the numeral 15, a bonnet generally designated by the numeral 12, and a valve stem generally designated by the numeral 16.

Figure 2:
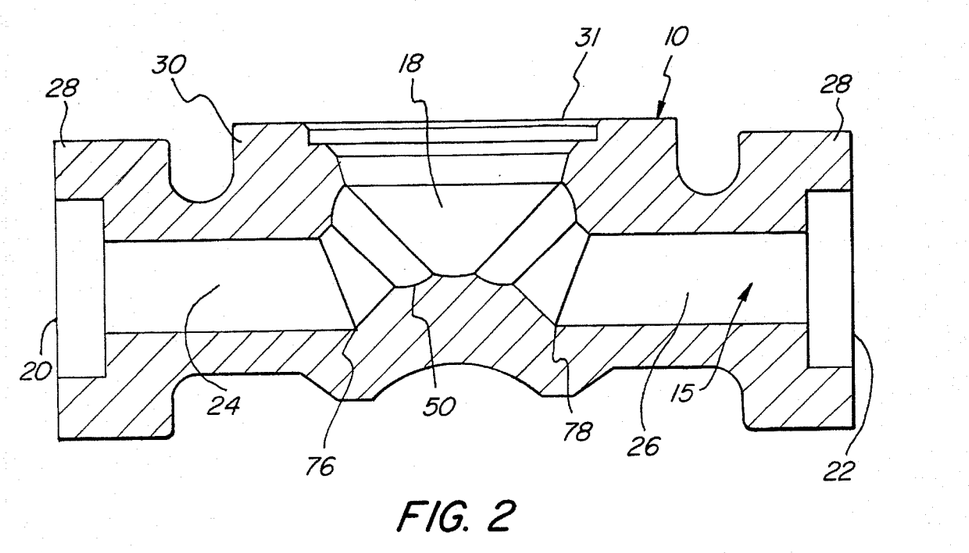
FIG. 2 is a cross sectional view of the valve body of the valve of FIG. 1.

As best seen in FIG. 2, the valve body 10 has a valve chamber 18 and inlet and outlet ports 20, 22 which communicate with the inlet and outlet portions 24, 26, or legs of the flow passage 15 provided by aligned rectilinear portions 28. The valve body 10 has an opening 31 in its upper end communicating with the chamber 18, and a collar 30 on the body 10 extends about the opening end 31 thereof. As seen in FIG. 1, the bonnet 12 seats on the collar 30 over the opening 31 and is secured to the body 10 by fasteners 32.

Figure 3:
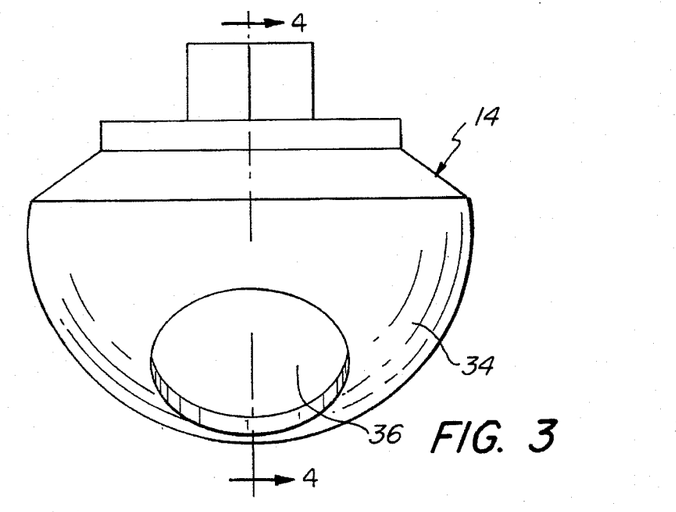
FIG. 3 is an elevational view of the ball member of the valve of FIG. 1.
Figure 4:
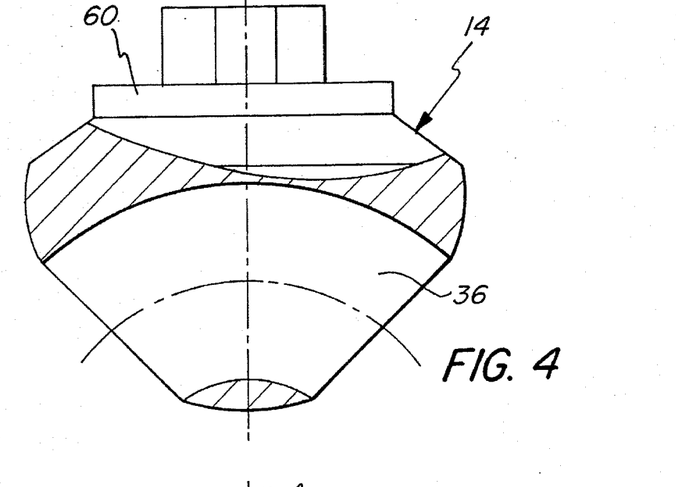
FIG. 4 is a view in partial section of the ball member along the line 4—4 of FIG. 3.

As illustrated in FIGS. 3 and 4, the ball member 14 has a lower spheroidal portion 34 through which extends a convexly arcuate flow passage 36 which is generally in the shape of an inverted "U". When the valve is in the open position, the ends of the arcuate passage 36 are aligned with the inlet and outlet portions 24, 26 of the flow passage 15 in the valve body 10 to permit fluid flow through the valve, as shown in FIG. 1. The valve is closed by rotating the ball member 14 through a 90° arc from the open position to seal the flow passage 15 by offsetting the ends of the arcuate passage 36 from the inlet and outlet portions 24, 26 of the flow passage 15. The ball member 14 may be rotated by a handle 38 which is engaged with the valve stem 16.

The inverted U-shaped flow passage 36 is disposed primarily in the lower spheroidal portion 34 of the ball member 14, as illustrated in FIGS. 3 and 4. The configurations and dimension of the lower spheroidal portion 34 of the ball member 14 cooperate with the body opening 31 to permit its easy removal through the opening 31.

Figure 1A:
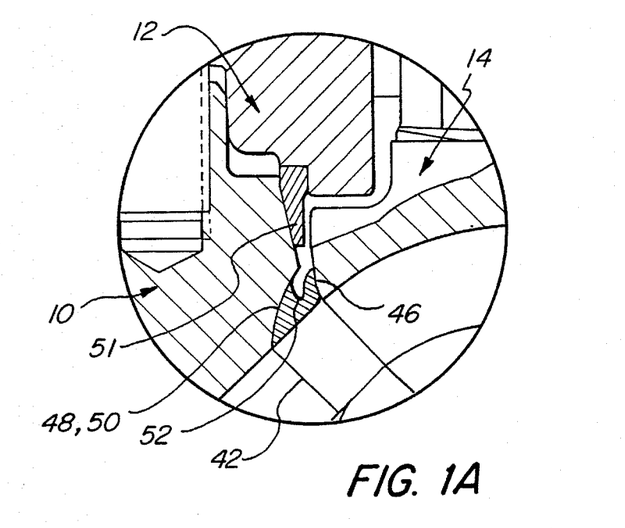
FIG. 1a is an enlarged view of the circled section of FIG. 1.

As illustrated in FIG. 1a, the bonnet 12 has a depending sealing flange 51 which extends into the opening 31 and seals against the valve body 10 to seal the valve chamber 18.

Figure 5:
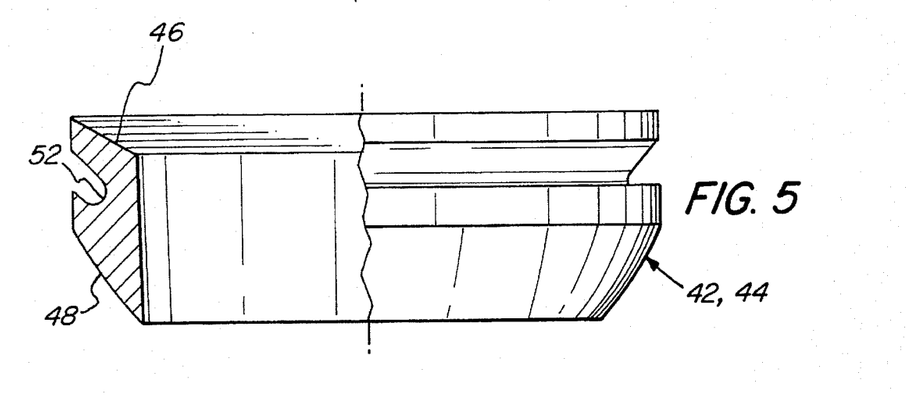
FIG. 5 is a greatly enlarged elevational view in partial section of a valve seat of the valve of FIG. 1.

As shown in FIG. 1, annular valve seats 42, 44 are disposed about the inlet and outlet portions 24, 26 of the flow passage 15 on both the upstream and downstream sides of the chamber 18. As best seen in FIGS. 1A and 5, the valve seats 42, 44 have a concave sealing surface 46 which is cooperatively configured with respect to the convex surface of the ball member 14. The opposite seating surface 48 is convexly curved and slidably seats in concave recesses 50 about the inlet and outlet portions 22, 24 of the flow passage 15. The concave sealing surface 46 and convex seating surface 48 permit the seats 42, 44 to slide and adjust themselves between the concave surfaces 50 of the body 10 and of the spheroidal portion 34 of the ball member 14. This self-adjusting feature accommodates minor dimensional differences between the interfitting portions of the valve seats 42 and 44, the valve body 10, and the ball member 14.

The valve seats 42, 44 also have a groove 52 which extends about the circumference thereof as illustrated in FIGS. 1A and 5. The groove 52 allows the peripheral portion of the seats 42, 44 to deflect under high pressure loading to urge the sealing surfaces 46 of the seats 42, 44 against the ball member 14.

Removal of the bonnet 12 allows top entry, inline access to both the ball member 14 and annular valve seats 42, 44 which are all cooperatively dimensioned and configured to permit insertion and removal through the opening 31 in the valve body 10. This construction enables the ball member 14, and valve seats 42, 44 of the valve to be replaced by simply removing the bonnet 12 from the valve body 10 while the valve remains in place in the operating line in which it is installed. The bonnet 12 is removably connected to the collar 30 of the valve body 10 by studs 54 and nuts 56, and this connection may also be sealed with O-rings 58, as shown in FIG. 6 or any other pressure activated seal such as a Graylock seal (not shown).

Figure 6:
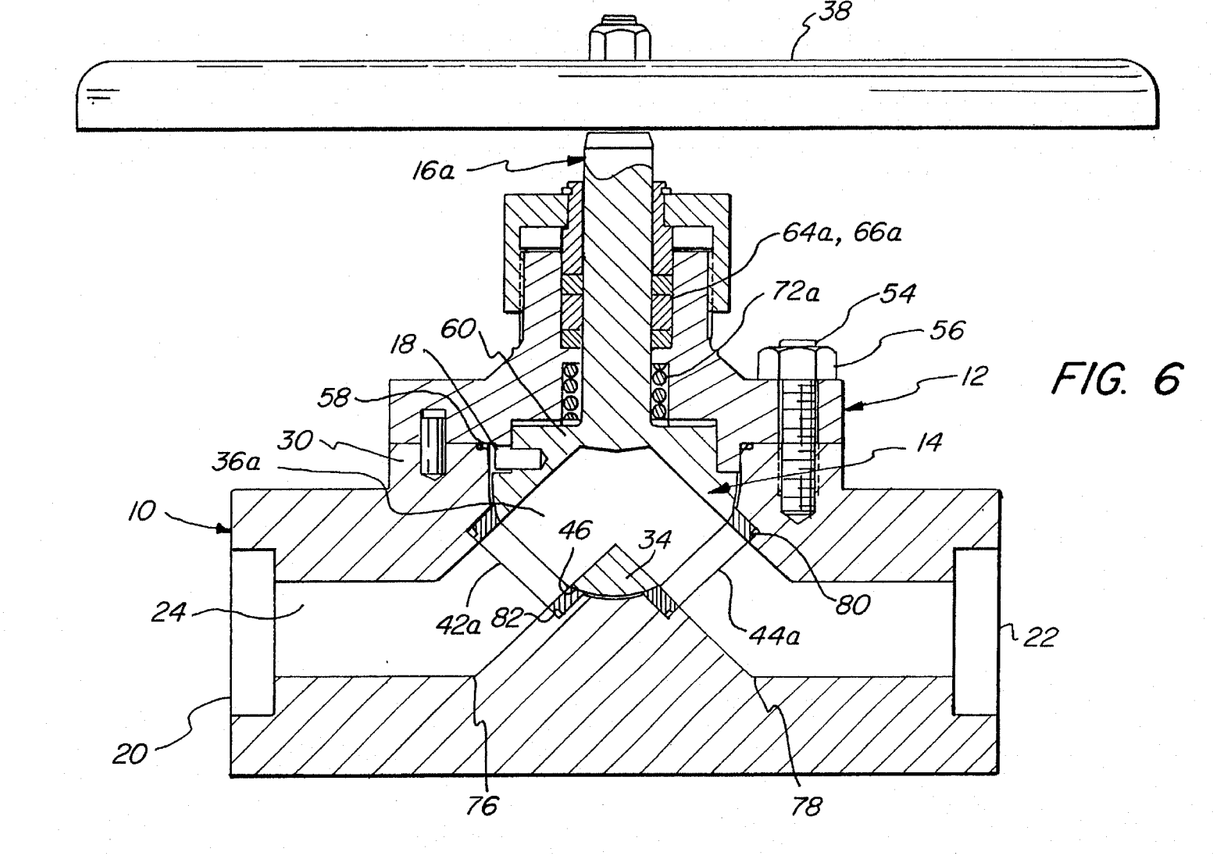
FIG. 6 is a cross sectional view of another embodiment of the valve of the present invention using a flow passage through the ball member of a different configuration.
Figure 7:
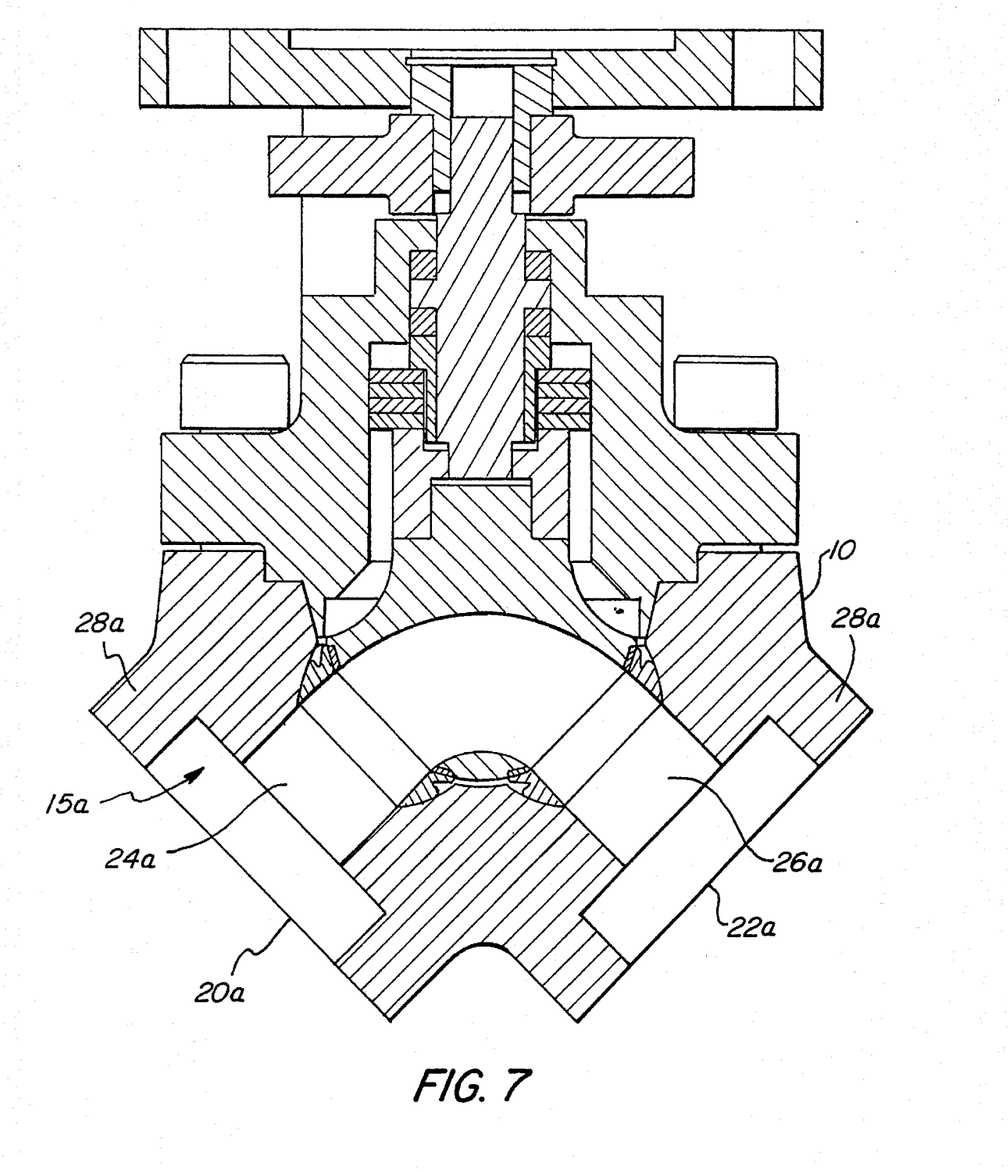
FIG. 7 is a vertical cross sectional view of still another embodiment of a ball valve with a flow passage in which the inlet and outlet ports are angularly oriented.

The upper portion 60 of the ball member 14 is generally cylindrical and extends into the bonnet 12, and is preferably coupled to a separate valve stem 16 as illustrated in FIGS. 1 and 7, although it may have an integral valve stem 16a as illustrated in FIG. 6. In either embodiment, the valve stem 16 seats within a cylindrical passageway 62 in the bonnet 12. As illustrated in FIG. 1, annular gland seals 64, 66 are provided about the periphery of the valve stem 16 and below a shoulder 68 in the passageway 62.

The stem 16 is coupled to the ball member 14 by the coupler 61 which has a recess seating the boss 63 on the ball member 14 and a bore 65 seating the lower end of the stem to effect driving engagement therebetween.

In the preferred embodiment illustrated in FIG. 1, the valve stem 16 has a collar 70 which has annular gland seals 64, 66 above and below it. The seals 64, 66 are compressed axially by the biasing force of Belleville washers 72 whose force is transmitted upwardly through the packing ring 74, the lower seal 66, the collar 70, the upper seal 64, and finally against the shoulder 68. The passageway 62 about the stem 16 is sealed by the seal 64 which is being compressed between the shoulder 68 and the collar 70, and also by the seal 66 which is being compressed between the collar 66 and the packing ring 72.

In addition to providing an upward biasing force on the seals 64, 66, the Belleville washers 72 also provide downward biasing force to maintain the ball member 14 firmly on the seats 42, 44 at all times.

In operation, fluid enters the valve body 10 through the inlet port 20 and travels horizontally in the inlet portion 24 of the flow passage 15 until it is directed upwardly at an angle of 45° by the bend 76 in the inlet portion 24. The fluid continues to flow upwardly through the annular valve seat 42 and into the arcuate flow passage 36 in the ball member 14. As the fluid flows past the inlet seat 42 into the arcuate flow passage 36 it forces the lower spheroidal portion 34 of the ball member 14 against the outlet seat 44 to act like a check piston. In addition, the fluid flow has an upward force component which increases as the valve is opened so that the force between the ball member 14 and the seats 42, 44 is thereby reduced and less torque is required to open the valve.

As the fluid flows through the ball member 14, it is redirected downwardly. The fluid flows from the ball member 14 through the annular valve seat 44 until it is again redirected by the bend 78 in the outlet portion 26 of the flow passage 15 and exits the body 10 as a horizontal flow at the outlet port 22.

As illustrated in FIG. 6, the flow passage 36 in the ball member 14 may have a sharper bend in the form of a generally inverted L or V instead of an inverted U.

As will be appreciated, various other designs may be used for the annular valve seats 42, 44 to position the seats in the housing. FIG. 6 illustrates an alternate configuration for the valve seats in which O-rings 80 are seated in a recess 82 in the periphery of the seats 42a, 44a to bias the seats 42a, 44a to provide a pressure seal between the seats 42a, 44a and the valve body 10.

As best illustrated in FIG. 6, the Belleville washers 72 may be replaced by a helical spring 72a which will bias the ball member 14 against the valve seats 42a, 44a.

The included angle of the anticlinal passage 36 through the ball member 14 may vary from a minimum of approximately 60° to a maximum of approximately 120°. However, the 90° included angle of the passage 36 illustrated in the drawings represents an optimum tradeoff between the competing design considerations for the cross-sectional area of the passage, the diameter of the ball member to locate the seat members below its diameter, and the degree of angle of the passage. For example, for a given size cross-sectional passage area 14, the diameter of the ball member 14 must increase as the angle of the arcuate passage 14 increases in order to permit the seats to remain about the lower spheroidal portion 34 of the ball member 14 in accordance with the present invention. However, as the included angle of the passage decreases, then the pressure drop across the valve increases. Thus, the 90° angle of the passage 36 in accordance with the preferred embodiment represents an optimum tradeoff between these competing design considerations.

As illustrated in FIG. 7, the inlet and outlet ports 20a, 22a of the valve body 10a may lie in planes which are oriented at an angle with respect to each other. This configuration enables the valve to readily serve as an elbow to attach pipes (not shown) which are similarly oriented at an angle with respect to each other which, in turn, significantly reduces installation costs by eliminating the necessity for a fitting and two welds. The planes in which the inlet and outlet ports 20a, 22a lie are aligned with the seats 42a, 44a and are also at an angle of 45° to the axis of rotation of the ball member and 90° with respect to each other.

As will be appreciated, various materials may be employed for the construction of the valve. Most conveniently, the ball member and seats should be of a hard, gall-resistant alloys to withstand frictional abrasion and erosion as the ball member is moved across the seats while effecting opening and closing of the valve, and they may be provided with wear resistant surface coatings by plasma deposition or the like.

Thus, it can be seen that the present invention provides a novel ball valve for operation under high pressure conditions, and which is highly effective and reliable, durable, and relatively easy and economical to manufacture. The housing is provided with a top opening, and the ball member and valve seats are cooperatively dimensioned and configured to be easily serviced inline without the necessity for removing the valve body from the operating line in which it is installed.

Having thus described the invention, what is claimed is:

1. A valve for controlling fluid flow and having open and closed positions comprising:
   (a) a housing providing a chamber therewithin and a fluid flow passage therethrough with inlet and outlet portions to and from said chamber adjacent the lower end of said housing, said housing also having an opening in its upper end communicating with said chamber;
   (b) a removable bonnet on said housing sealing said opening in said upper end and having a passage extending therethrough from said chamber;
   (c) means fastening said bonnet to said housing;
   (d) a generally hemispherical plug member rotatably seated in said chamber and having an axis of rotation aligned with the center of said opening in said housing, said opening in said housing and said plug member being cooperatively dimensioned to permit removal of said plug member therethrough, said plug member having
      (i) a spheroidal lower portion having an anticlinal shaped fluid flow passage therethrough with inlet and outlet ends, said inlet and said outlet ends of said plug member being aligned with said inlet and outlet portions of said flow passage into and from said chamber in the open position of said valve and being displaced from said inlet and outlet portions of said flow passage in the closed of said valve, said flow passage extending through said axis of rotation; and
      (ii) an upper portion;
   (e) valve seats removably seated in said housing within said chamber and extending about said inlet and outlet portions of said flow passage, the wall of said chamber of said housing having annular concave recesses about said inlet and outlet portions with transverse axes extending perpendicularly to the flow axes of the adjacent inlet and outlet end portions of said anticlinal flow passage through said plug and of said inlet and outlet portions of said flow passage into and from chamber, said valve seats being seated in said annular concave recesses and extending outwardly of said recesses into said chamber, said valve seats including a concave surface in sealing engagement with the surface of said lower portion of said plug member, said valve seats being dimensioned and configured for facile insertion into and removal from said annular arcuate recesses in said chamber through said opening in said housing; and (f) means for rotating said plug member about its axis of rotation between said open and closed positions of said valve, said means for rotating having a portion disposed outwardly of said housing and bonnet and operatively connected to said upper portion of said ball member trough said passage in said bonnet.

2. A valve in accordance with claim 1 wherein said anticlinal shaped portion of said fluid flow passage through said plug member is of generally inverted U-shaped configuration and wherein said valve seats are oriented at an angle of 45° to the axis of rotation of said plug member.

3. A valve in accordance with claim 1 wherein said anticlinal shaped portion of said fluid flow passage through said plug member has a pair of legs extending at a right angle to each other from said axis of rotation of said plug member to form a generally inverted L-shaped potion of said flow passage through said plug member, and wherein said valve seats are oriented at an angle of 45 degrees to the axis of rotation of said plug member.

4. A valve in accordance with claim 1 wherein said means for rotating includes a valve stem extending within said passage of said bonnet and connected at one end to said upper portion of said plug member.

5. A valve in accordance with claim 4 wherein said valve stem is separate from and coupled to said plug member.

6. A valve in accordance with claim 4 wherein said valve includes resiliently deflectable means biasing said plug member towards said valve seats.

7. A valve in accordance with claim 6 wherein said resiliently deflectable means comprises a helical spring.

8. A valve in accordance with claim 6 wherein said resiliently deflectable means comprises at least one resiliently deflectable annular member.

9. A valve in accordance with claim 6 wherein said passage in said bonnet is configured to provide a shoulder extending thereabout, and wherein said valve includes a first annular sealing member disposed about said valve stem and against said shoulder, said valve stem having a collar extending thereabout within said passage in said bonnet and disposed below and bearing against said first annular sealing member, and wherein said valve also includes a second annular sealing member disposed below said collar and a packing gland disposed about said valve stem below said second annular sealing member above said resiliently deflectable means, said deflectable means biasing said packing gland against said second sealing member and said collar.

10. A valve in accordance with claim 1 wherein said valve seats have convex seating surfaces which seat in said annular concave recesses about said inlet and outlet portions of said flow passage in said housing.

11. A valve in accordance with claim 1 wherein said valve seats include a groove extending about the circumference thereof and providing means for biasing said concave sealing surface against the surface of said ball member.

12. A valve in accordance with claim 1 wherein said inlet portion of said flow passage extends from an inlet port, said outlet portion of said flow passage extends from an outlet port, and said inlet and outlet ports lie in planes oriented at an angle with respect to each other.

13. A valve in accordance with claim 12 wherein said planes in which said inlet and outlet ports lie are oriented at an angle of 45° to the axis of rotation of said plug member and 90° with respect to each other.

14. A valve for controlling fluid flow and having open and closed positions comprising:

(a) a housing providing a chamber therewithin and a fluid flow passage therethrough with inlet and outlet portions to and from said chamber adjacent the lower end of said housing, said housing also having an opening in its upper end communicating with said chamber;

(b) a bonnet on said housing sealing said opening in said upper end and having a passage extending therethrough from said chamber, said passage including a shoulder extending thereabout;

(c) means fastening said bonnet to said housing;

(d) a generally hemispherical plug member rotatably seated in said chamber and having an axis of rotation aligned with the center of said opening in said housing and said plug member having
  (i) a spheroidal lower portion including an anticlinal shaped fluid flow passage therethrough with inlet and outlet ends, said inlet and outlet ends of said plug member being aligned with said inlet and outlet portions of said flow passage into and from said chamber in the open position of said valve and being disposed from said inlet and outlet portions of said flow passage in the closed position of said valve; and
  (ii) an upper portion;

(e) a cylindrical valve stem extending within said passage of said bonnet operatively connected at one end to said upper portion of sad plug member for rotating said plug member about its axis of rotation between said open and closed positions of said valve; said valve stem having a portion disposed outwardly of said housing at its other end;

(f) means for rotating said valve stem;

(g) resiliently deflectable means in said bonnet about said valve stem;

(h) a first annular sealing member disposed about said valve stem and against said shoulder, said valve stem having a collar extending thereabout within said passage in said bonnet and disposed below and against said first annular sealing member;

(i) a second annular sealing member disposed below and against said collar;

(j) a packing gland disposed about said valve stem below and against said second annular sealing member, said resiliently deflectable means biasing said packing gland against said second sealing member; and (k) valve seats removably seated in said housing within said chamber and extending about said inlet and outlet portions of said flow passage, the wall of said chamber of said housing having annular concave recesses about said inlet and outlet portions with transverse axes extending perpendicularly to the flow axes of the adjacent inlet and outlet portions of said anticlinal flow passage through said plug and of said inlet and outlet portions of said flow passage into and from chamber, said valve seats being seated in said annular concave recesses and extending outwardly of said recesses into said chamber, said valve seats including a concave surface in sealing engagement with the surface of said lower portion of said plug member, said valve seats being dimensioned and configured for facile insertion into and removal from said annular arcuate recesses in said chamber through said opening in said housing.

15. A valve in accordance with claim 14 wherein said resiliently deflectable means comprise at least one resiliently deflectable annular member.

16. In a ball valve for controlling fluid flow and having open and closed position, the combination comprising:

(a) a housing providing a chamber therewithin and a fluid flow passage therethrough, with inlet and outlet portions to and from said chamber adjacent the lower end of said housing;

(b) a plug member rotatably seated in said chamber and having a spheroidal lower portion with a portion of said fluid flow passage extending therethrough providing inlet and outlet ends, said inlet and said outlet ends of said plug member being aligned with said inlet and outlet portions of said flow passage into and from said chamber in the open position of said valve and being displaced from said inlet and outlet portions of said flow passage in the closed position of said valve;

(c) valve seats seated in said housing within said chamber and extending about said inlet and outlet portions of said flow passage, said valve seats including a concave surface in sealing engagement with the surface of said lower portion of said plug member, said valve seats having convex seating surfaces opposite said concave surfaces, the wall of said chamber having concave annular recesses providing sealing surfaces in said chamber about said inlet and outlet portions with transverse axes extending perpendicularly to the flow axes of the adjacent inlet and outlet end portions of said anticlinal flow passage through said plug and of said inlet and outlet portions of said flow passage into and from chamber of said flow passage and said convex surface of said valve seats being seated in said annular concave recesses and extending outwardly of said recesses into said chamber, said valve seats being in sealing engagement with said concave surfaces of said housing; and (d) means for rotating said plug member about its axis of rotation between said open and closed positions of said valve, said means for rotating having a portion disposed outwardly of said housing and bonnet and operatively connected to said upper portion of said plug member through said passage in said bonnet.

17. A valve in accordance with claim 16 wherein said valve seats include a groove extending about the circumference thereof and providing means for biasing said concave sealing surface against the surface of said plug member.

\* \* \* \* \*

UNITED STATES PATENT AND TRADEMARK OFFICE
CERTIFICATE OF CORRECTION

PATENT NO. : 5,531,244
DATED : July 2, 1996
INVENTOR(S) : Chester A. Siver

It is certified that error appears in the above-indentified patent and that said Letters Patent is hereby corrected as shown below:

Column 6, line 48, after "closed" insert --position--.

Column 7, line 8, delete "trough" and insert --through--.

column 8, line 21, delete "disposed" and insert --displaced--;
line 26, delete "sad"and insert --said--.

Signed and Sealed this

Twenty-second Day of October, 1996

Attest:

BRUCE LEHMAN

*Attesting Officer*     *Commissioner of Patents and Trademarks*